United States Patent [19]

Wiethorn

[11] Patent Number: 5,649,724
[45] Date of Patent: Jul. 22, 1997

[54] SECONDARY LATCH AND INDICATOR FOR FLUID COUPLING

[75] Inventor: Thomas Wiethorn, Rochester Hills, Mich.

[73] Assignee: Enhanced Applications L.C., Lincoln Park, Mich.

[21] Appl. No.: 397,976

[22] Filed: Mar. 3, 1995

Related U.S. Application Data

[63] Continuation-in-part of Ser. No. 61,023, May 13, 1993, Pat. No. 5,395,140.

[51] Int. Cl.$^6$ ............................................. F16L 35/00
[52] U.S. Cl. ................................................ 285/93; 285/320
[58] Field of Search ................................ 285/320, 93

[56] References Cited

U.S. PATENT DOCUMENTS

| | | |
|---|---|---|
| 833,408 | 10/1906 | McCann . |
| 928,370 | 7/1909 | Feickert . |
| 964,238 | 7/1910 | Goss . |
| 1,043,806 | 11/1912 | Dahl . |
| 2,281,633 | 5/1942 | Stitzer . |
| 3,278,205 | 10/1966 | Barlow . |
| 4,068,870 | 1/1978 | Whitney et al. . |
| 4,423,892 | 1/1984 | Bartholomew . |
| 4,703,957 | 11/1987 | Blenkush ............................... 285/93 X |
| 4,753,458 | 6/1988 | Case et al. ............................. 285/93 |
| 4,895,396 | 1/1990 | Washizu ................................. 285/93 |
| 4,913,467 | 4/1990 | Washizu ................................. 285/93 X |
| 4,925,217 | 5/1990 | Ketcham . |
| 4,936,544 | 6/1990 | Bartholomew . |
| 4,946,205 | 8/1990 | Washizu ................................. 285/93 X |
| 4,964,658 | 10/1990 | Usui et al. ............................. 285/93 X |
| 4,979,765 | 12/1990 | Bartholomew . |
| 5,033,513 | 7/1991 | Bartholomew . |
| 5,063,968 | 11/1991 | Bartholomew . |
| 5,110,161 | 5/1992 | Bartholomew . |
| 5,123,677 | 6/1992 | Kreczko et al. . |
| 5,152,555 | 10/1992 | Szabo . |
| 5,401,063 | 3/1995 | Plosz ..................................... 285/320 X |

FOREIGN PATENT DOCUMENTS

| | | | |
|---|---|---|---|
| 340194 | 11/1989 | European Pat. Off. ............... | 285/320 |
| 910732 | 5/1954 | Germany ............................... | 285/320 |
| 3739745 | 11/1988 | Germany ............................... | 285/320 |
| 72717 | 10/1947 | Norway ................................. | 285/320 |
| 1155913 | 6/1969 | United Kingdom .................. | 285/320 |

*Primary Examiner*—Dave W. Arola

[57] ABSTRACT

Connector assemblies for use with tubular conduits which mate with a housing having an axial bore for receiving one end of the conduit is disclosed. The connector assemblies include a latch having an inwardly extending projection which seats in behind an outwardly projection portion contained on the tubular conduit to retain the conduit within the housing. The latch thus provides a mechanism for establishing that the tubular conduit has been fully inserted within the housing upon connection.

14 Claims, 4 Drawing Sheets

SECONDARY LATCH AND INDICATOR FOR FLUID COUPLING

The present application is a continuation-in-part of U.S. patent application Ser. No. 08/061,023, filed May 13, 1993, entitled "Secondary Latch and Indicator For Fluid Coupling" which issued as U.S. Pat. No. 5,395,140 on Mar. 07, 1995, said application being hereby expressly incorporated by reference.

BACKGROUND OF THE INVENTION

The present invention relates to a connector assembly for fluid conveying conduits and, more particularly, to a connector assembly including a latching mechanism useful for confirming connection between the male conduit and female housing elements of the connector assembly.

In the automotive industry, as well as for many other industries, the need always exists for low cost, reliable, and easy to assemble components. This need is especially apparent with respect to providing a connection between fluid conveying conduits, such as fuel or refrigerant lines. Older threaded connectors typically require substantial assembly time for screwing on a cap to a fitting and tightening the cap down to the proper torque needed to provide a fluid tight seal. Further, an inventory would have to be maintained to keep track of the number of caps and fittings and any liners for other components that may be necessary. Also, re-tightening of the caps may be required to maintain the seal after the automobile or other system has been put into use.

Recently, therefore, there has been a move towards utilizing connector assemblies, and particularly quick connector assemblies, wherein a threaded connection is no longer needed to connect the male conduit and female housing elements. The quick connector assembly typically includes a female housing, a male conduit and some type of retainer for securing the male conduit within the female housing. One problem with many of the known quick connector assemblies is the failure to provide a check mechanism to insure that the male conduit is securely connected to the female housing. Further, for those connector assemblies including some type of check mechanism, the mechanism is typically disposed within the female housing which precludes a visual inspection of the quick connector assembly to confirm a complete coupling between the male conduit and the female housing.

Accordingly, it is the primary object of the present invention to provide an improved connector assembly for providing a quick connection between fluid conveying conduits wherein the coupling mechanism serves to insure that a proper connection has been made between the tubular conduit and the housing.

In addition, it is an object of the present invention to provide a device which allows for visual inspection to periodically insure that the connection has been maintained.

Yet another object is to provide a secondary coupling between the tubular conduit and the housing.

Still another object of the present invention is to provide an easily connectable assembly which is inexpensive to manufacture, durable and may be employed to join dissimilar electrically conductive materials that would otherwise be subject to galvanic corrosion.

To achieve the foregoing objects, the present invention provides a connector assembly which generally comprises a tubular conduit, a housing, sealing means, a retainer element and a latching mechanism. The tubular conduit is adapted to convey fluid and is formed with a radially outwardly extending projection disposed a predetermined distance from the end of the conduit to be connected. The housing is formed with an axial bore for receiving the terminal end of the conduit along one end and for providing a fluid path at a second end. The housing also includes a collar portion which generally hosts the latching mechanism. The sealing means are disposed within the axial bore of the housing to provide for a fluid tight seal between confronting portions of the conduit and housing.

The retainer element, if employed, is adapted to be disposed generally over the first end of the tubular conduit and extends partially within the axial bore of the housing. The retainer element typically includes at least one deformable leg having a blocking portion which seats against a transverse wall provided along the collar portion of the housing.

The latch is generally pivotally attached to the female housing or the collar portion of the female housing and can be rotated to lockingly engage either the tubular conduit or housing itself. The pivotable latch embodiments are generally provided with at least one projecting tab which snaps into a slot provided along the collar portion of the female housing to insure that connection between the tubular conduit and female housing is complete.

Additional objects and advantages of the present invention will become apparent from a reading of the detailed description of the preferred embodiments which makes reference to the following set of drawings in which:

DETAILED DESCRIPTION OF THE PREFERRED EMBODIMENT

Figures 1, 2:
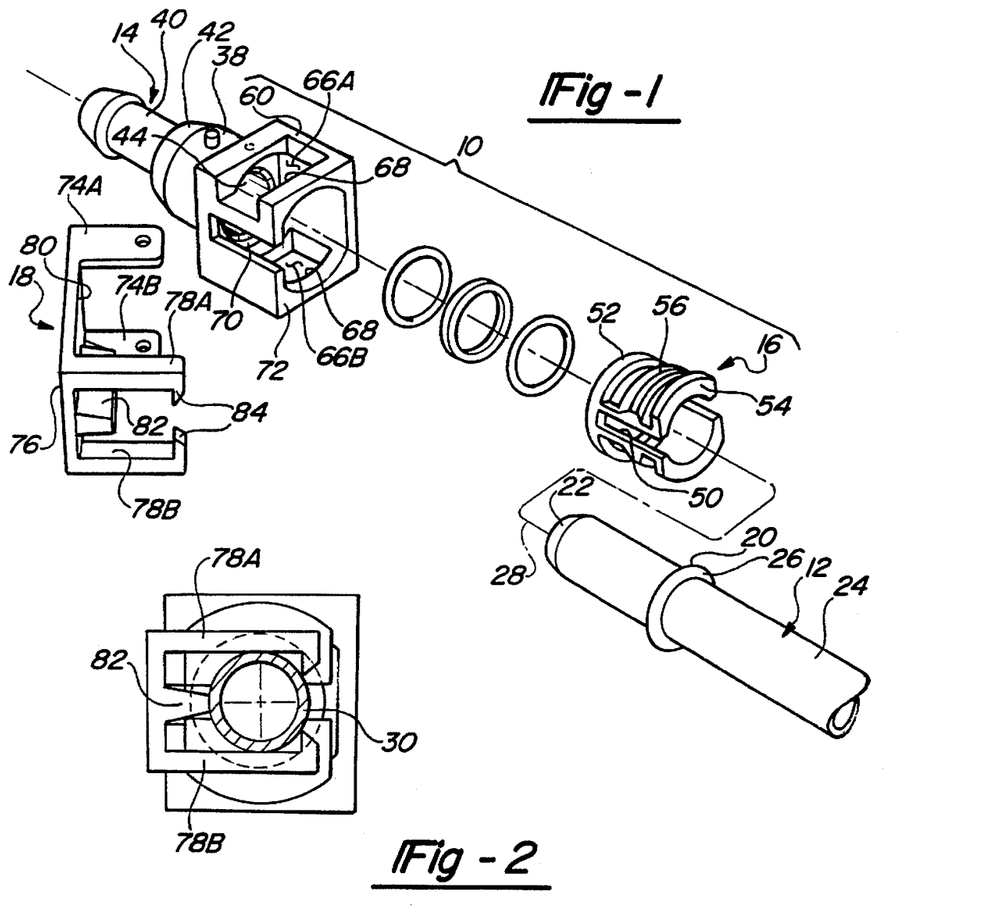
FIG. 1 is an exploded perspective view of a first connector assembly embodiment according to the teachings of the present invention.
FIG. 2 is an assembled end view of the connector assembly embodiment of FIG. 1.

Referring to FIG. 1, a blown out perspective view of a connector assembly 10 according to the present invention is shown. The connector assembly is generally comprised of tubular conduit 12 adapted to convey fluid, a housing 14, a retainer element 16 and latching means 18. Conduit 12 is provided with a radially outwardly extending projection 20 generally having an annular configuration which is displaced from a terminal connecting end 22 of the conduit and an outer surface 24. The projection 20 is typically formed with at least one blocking wall 26 disposed substantially transversely or perpendicularly to the central axis 28 of the conduit.

The housing 14 may include any number of sections depending mainly upon the customer's needs but typically includes an enlarged diameter portion 38, a reduced diameter portion 40, and a third diameter portion 42. Internally, the housing includes an axial bore 44 for receiving the sealing means 46 which are commonly used in fluid coupling assemblies to accomplish a fluid tight seal.

The housing 14 also generally includes with a collar portion 60 which extends integrally from or is attached to the enlarged diameter portion 38 of the housing 14. The collar portion 60 preferably includes cut out portions otherwise referred to herein as windows 66A and 66B located along opposite sides of the collar, i.e. along the top and bottom or on both sides. The windows provide transverse blocking walls 68 for abutting engagement with the tab portions 56 of retainer element 16. The collar portion 60 also preferably includes a slot 70 located between the windows 66A and 66B, generally along at least one of the sides of the collar portion. As illustrated in FIG. 1, the slot 70 extends continuously rearwardly from the terminal end 72 of the collar in the direction of the enlarged diameter portion 38 of the housing. As will be understood by those skilled in the art, the slot 70 need not extend from the terminal end 72 as shown, but may alternatively be in the form of an elongated window similar to those shown in FIGS. 3, 3A and 3B, respectively.

The retainer element 16 is generally made from a resilient material, such as metal or plastic, and is comprised of a pair of elongated legs 50 normally extending from opposite ends of a ring member 52. Each leg includes an outwardly projecting flange 54 disposed along the distal portion of the leg and a tab portion 56 extending somewhat lower on the leg. Located between the tab portion and flange is a transverse groove 58.

The latching mechanism or "latch" 18 comprises a pair of spaced apart legs 74A and 74B pivotally attached along a first terminal end to the enlarged diameter portion 38 of the housing, a body portion 76 extending from the second end of legs 74A and 74B and a pair of elongated tangs 78A and 78B extending from the body portion 76 in the general direction of and parallel to legs 74A and 74B. Preferably, the elongated tangs have inwardly extending protrusions 84 which assist in locking the latch onto the tubular conduit as illustrated in FIG. 2.

As illustrated in both FIGS. 1 and 2, the inner surface 80 of the body portion 76 is preferably configured geometrically to abut the collar portion 60 with the inwardly extending validation tab 82 designed to extend through the slot 70 and seat against the conduit upon complete connection between the conduit and the housing. To accomplish operational engagement between the tubular conduit 12 and the female housing 14, the tubular conduit 12 is inserted into the housing through the collar portion 60 until the tab portions 56 of the retainer element 16 (having previously been disposed within the collar or over the terminal end of the tubular conduit 12) snaps into abutting engagement with the transverse blocking walls 68 provided by the windows 66A and 66B.

Thereafter, the latch 18 is pivotally rotated such that the tangs 78A and 78B snap over the outer surface 24 of the tubular conduit and the validation tab 82 extends through slot 70 to lock in behind the outwardly extending projection 20 of the tubular conduit. As will be appreciated upon a thorough review of FIGS. 1 and 2, attachment of the tangs 78 over the tubular conduit can only be accomplished if the validation tab 82 is able to fully extend into the slot. This, in turn, is only possible if the tubular conduit 12 has been inserted sufficiently deeply within the housing such that the validation tab 82 seats in behind the outwardly extending projection. Otherwise, the validation tab will come into direct contact with the outwardly extending projection and be precluded from further insertion into the slot.

As will be further appreciated by those skilled in the art, upon review of this disclosure, while it is preferred that the connector assembly employ both the retainer element 16 and the latch 18, due to the inherent structure of the latch, there may be instances, such as low pressure conditions, where connection between the conduit 12 and the housing 14 would only require that the latch be employed.

Figure 3:
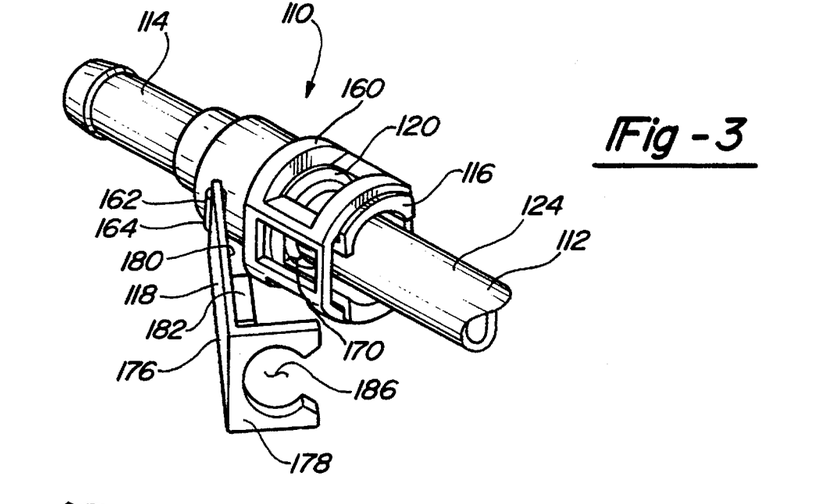
FIG. 3 is an assembled perspective view of still another connector assembly embodiment according to the teachings of the present invention.
Figure 3A:
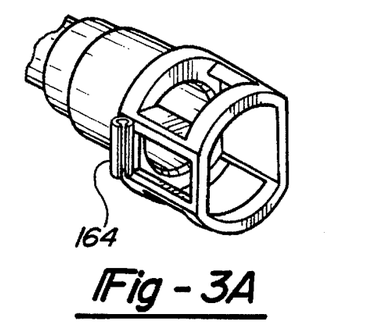
FIGS. 3A and 3B are partially broken away perspective views of housings including alternative hinge locations according to the teachings of the present invention.
Figure 3B:
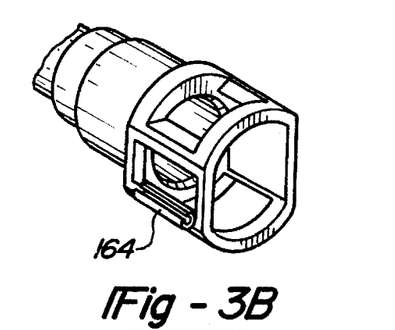

Referring to FIG. 3, an assembled perspective view of an alternative connector assembly embodiment is provided. The connector assembly 110 again includes a tubular conduit 112 including an outwardly extending projection 120, a housing 114, a retainer element 116 and a latch 118. Under this embodiment, the substantially L-shaped latch 118 is attached along a first end of the body portion 176 to a hinge 162 extending from enlarged diameter portion of the housing 114. The hinge 162 includes a substantially C-shaped coupling portion 164 which receives a cross bar provided along the first end of the latch. The latch also includes means for coupling the latch to the conduit. The means for coupling the latch to the conduit includes a wall 178 extending from the body portion having a recess 186 which is configured to matingly engage the outer surface 124 of the tubular conduit.

The latch is again provided with a validation tab 182 which extends from the inner surface 180 of the body portion whereby upon complete rotation of the latch, the validation tab extends through the slot 170 provided along the collar portion 160. Ideally, upon connection of the means for coupling the latch to the conduit, the inner surface 180 of the body portion 176 will seat against the side of the collar portion including the slot to provide structural support to the connector assembly. Hereto, if the tubular conduit 112 is not fully inserted within the female housing 114, either with or without the inclusion of the retainer element 116 as previously described, the validation tab 182 will engage the outwardly extending projection thereby precluding connection of the latch to the conduit. As illustrated with reference to FIGS. 3A and 3B, it should be recognized by those skilled in the art that similar latch assemblies can be utilized wherein the hinge and pivotable latch extend from differing positions along the collar portion as well.

Figure 4:
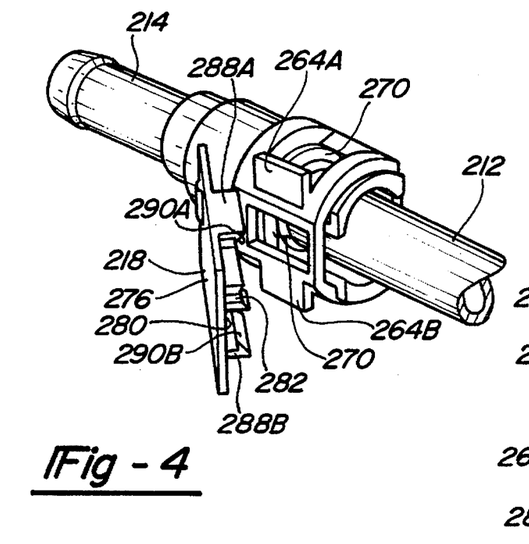
FIG. 4 is an assembled perspective view of another connector assembly embodiment according to the teachings of the present invention.
Figure 5:
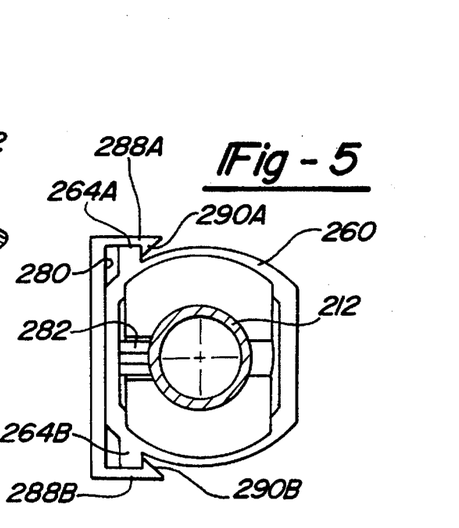
FIG. 5 is an assembled end view of the connector assembly shown in FIG. 4.

Referring to FIGS. 4 and 5, an alternative connector assembly embodiment in accordance with the teachings of the present invention is provided. As illustrated in FIGS. 4 and 5, both the housing 214 and the latch 218 have been modified such that engagement of the conduit 212 by the latch is no longer required. The housing 214 is provided with a pair of outwardly extending posts 264A and 264B disposed along the top and bottom of the slot 270. Additionally, the latch 218 is provided with a pair of laterally spaced hooks 288A and 288B which extend from the body portion 276 of the latch 218. Preferably, the hooks 288A and 288B are resiliently flexible and include inwardly extending and opposing teeth 290A and 290B, respectively, which snap over the posts 264A and 264B upon sufficient pivotal rotation of the latch 218. Likewise, as the latch is rotated such that the hooks 288A and 288B engage the posts 264A and 264B, the validation tab 282 disposed on the inner surface 280 of the latch extends through the slot 270 to lock in behind the radially outwardly extending projection 220 of the conduit.

Figures 6, 7, 8:
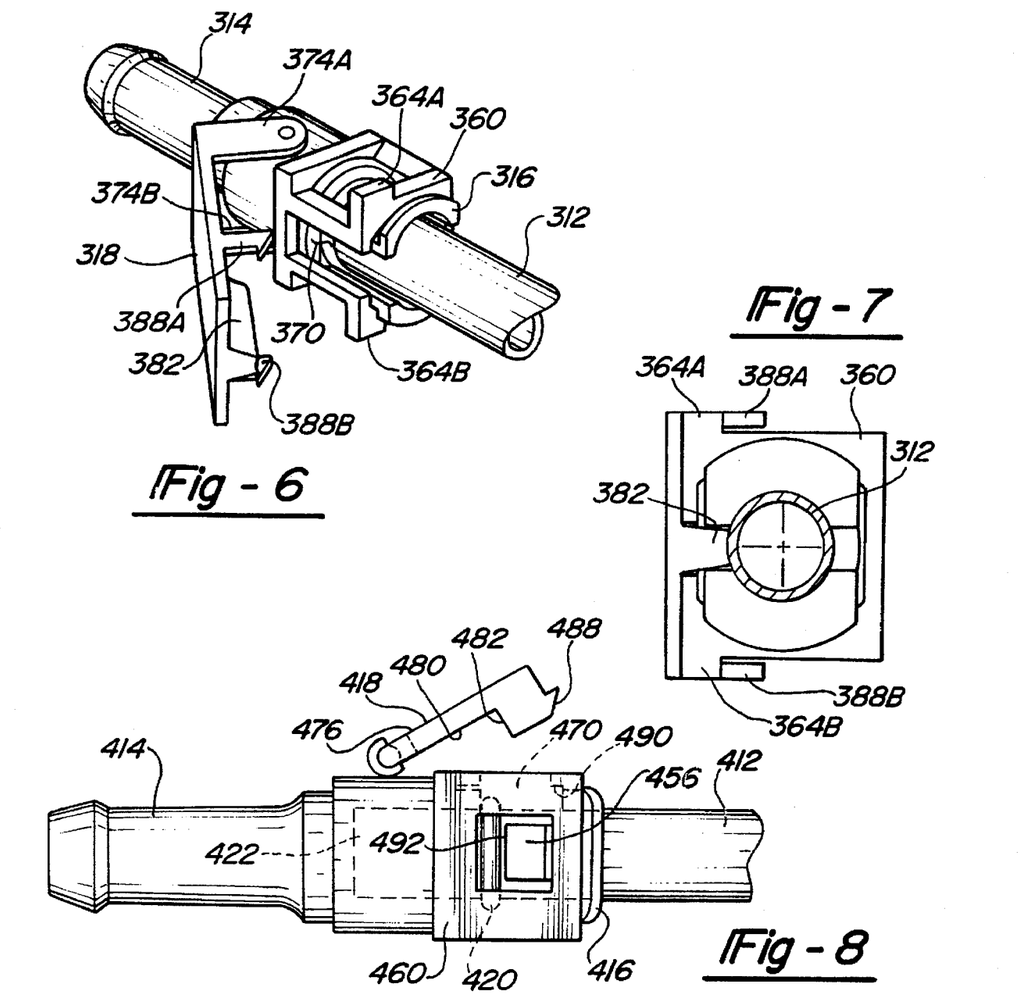
FIG. 6 is an assembled perspective view of yet another connector assembly embodiment according to the teachings of the present invention.
FIG. 7 is an assembled end view of the connector assembly shown in FIG. 6.
FIG. 8 is an assembled side elevational view of still another alternative connector assembly embodiment according to the teachings of the present invention.

Referring to FIGS. 6 and 7, yet another connector assembly embodiment employing a housing engaged latch is provided. The latch 318 illustrated in FIGS. 6 and 7 includes a pair of pivotally attached legs 374A and 374B rather than the hinged pivotal attachment as illustrated in FIGS. 6 and 7. In addition, the outwardly extending posts 364A and 364B are disposed along the terminal end of the collar portion 360 rather than along a side of the collar portion as illustrated in FIGS. 4 and 5.

Thus, to accomplish operational engagement between the tubular conduit 312 and the housing 314, the conduit is inserted into the housing with or without the retainer element 316 depending on the application. Thereafter, the latch 318 is pivotally rotated until the validation tab 382 extends through the slot 370 and the hooks 388A and 388B snap over the outwardly extending posts 364A and 364B. As with the previously described embodiments, connection of the latch 318 requires that the tubular conduit 312 has been sufficiently inserted into the housing 314, otherwise the validation tab will contact the outwardly extending projection 320 of the conduit and be precluded from fully extending into the slot 370.

Figure 9:
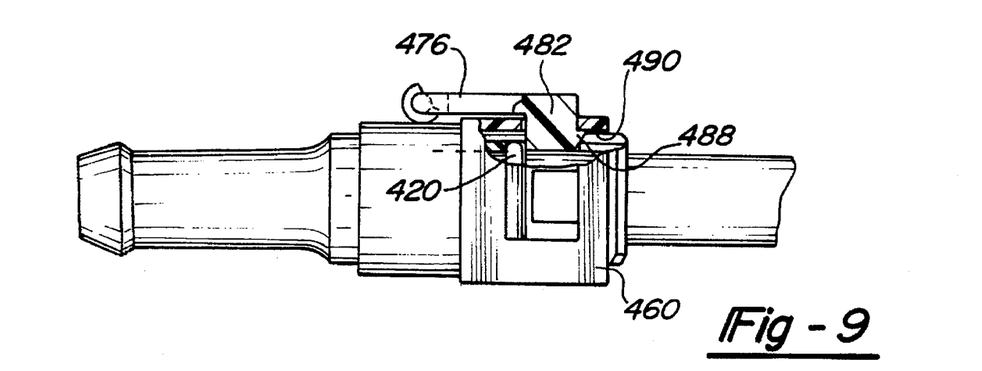
FIG. 9 is a partially broken away side elevational view showing the connector assembly of FIG. 8.

Still another connector assembly embodiment in accordance with the teachings of the present invention is illustrated in FIGS. 8 and 9. The connector assembly 410 illustrated in FIGS. 8 and 9 also includes a tubular conduit 412 with an outwardly extending projection 420 displaced from the terminal end 422, a housing 414 for receiving the terminal end 422 of the tubular conduit, a retainer element 416 and a latch 418. The tubular conduit 412, housing 414 and retainer element 416 are all substantially the same as those depicted in the embodiments of FIGS. 1 and 2, the main difference being in the latch 418. Thus, as illustrated, the leading edge 492 of the tab portion 456 seats in behind the radially outwardly extending projection 420 of the conduit upon complete insertion of the conduit into the retainer and housing to preclude the undesired removal of the conduit from the housing.

According to this embodiment, the latch 418 is pivotally connected to the housing via a hinge. The latch 418 also includes a body portion 476 having a validation tab 482 extending inwardly from the inner surface 480. Unlike the other embodiments thus described, the validation tab 482 also includes an integral hook portion 488 which serves as the means for selectively retaining the latch in an engaged position. As the latch is pivotally rotated toward engagement after having previously joined the tubular conduit within the housing, the validation tab 482 extends through the slot 470 and the hook portion 488 snaps under the inner surface 490 of the housing collar portion 460. As with the other embodiments described herein, the validation tab 482 will only extend through the slot 470 if the conduit has been sufficiently inserted within the housing. Thus, not only does the validation tab serve as a secondary latch in instances where the retainer element 416 is employed, but also serves as a check mechanism to insure a proper connection between the tubular conduit and the housing.

Figure 10:
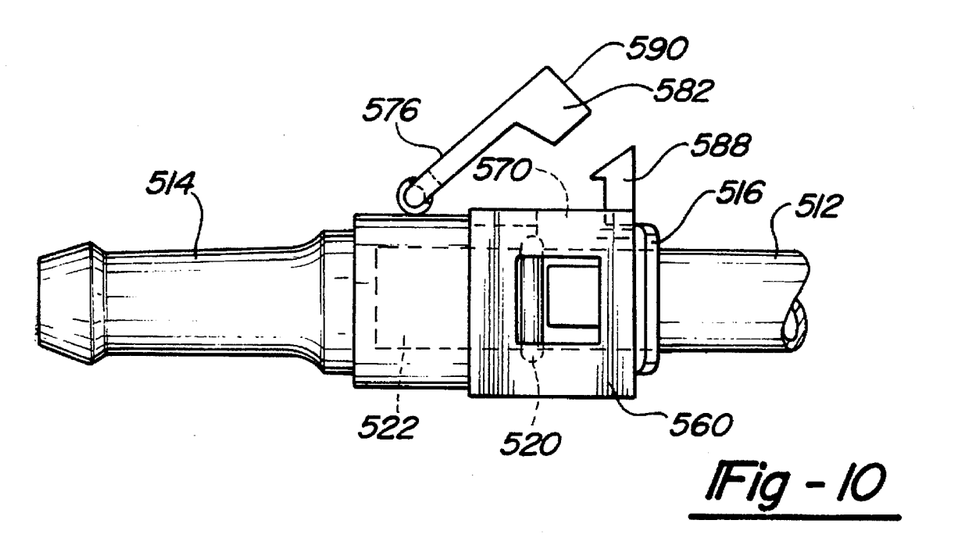
FIG. 10 is an assembled side elevational view of an alternative connector assembly embodiment according to the teachings of the present invention.
Figure 11:
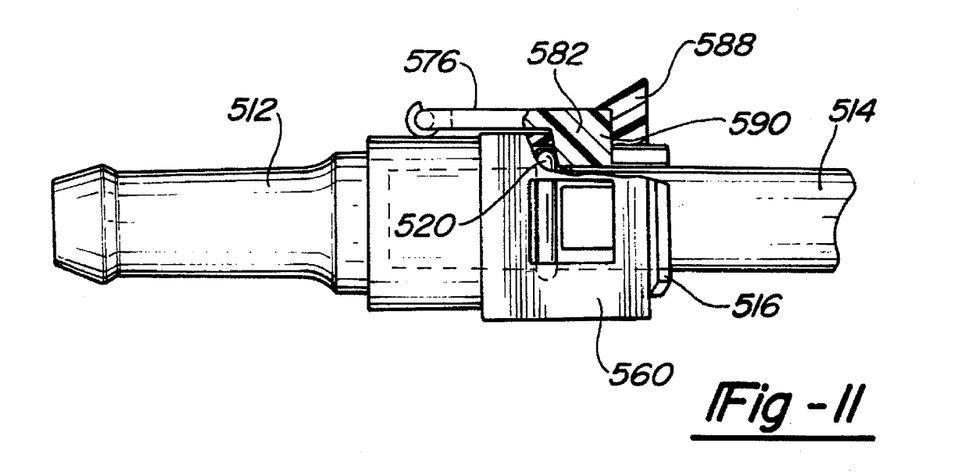
FIG. 11 is a partially broken away side elevational view of the connector assembly of FIG. 10.

Referring to FIGS. 10 and 11, a variation of the embodiment shown in FIGS. 8 and 9 is illustrated. Under the embodiment of FIGS. 10 and 11, the tubular conduit 512, housing 514 and retainer element 516 are unchanged except that the housing 514 and, more particularly, the collar portion 560 is provided with a hook member 588 which overhangs the slot 570. The latch 518, which is hingedly attached to the housing 514, includes a validation tab 582 extending inwardly from the body portion 576 of the latch. As the latch is pivotally rotated toward engagement with the housing, the leading edge 590 of the latch snaps past the hook member 588 and is retained thereunder upon full rotation. Again, the validation tab extends into the slot 570 such that the validation tab seats in behind the outwardly extending projection 520 of the tubular conduit to provide a secondary latch when the retainer element is employed.

As can thus be appreciated, regardless of the particular embodiment shown and described herein, each embodiment offers a means for verifying that a complete connector has been provided between the tubular conduit and the housing wherein the latch cannot engage either the conduit or the housing unless the tubular conduit is sufficiently inserted within the housing.

While the above description constitutes the preferred embodiments of the present invention, it is to be appreciated that the invention is susceptible to modification, variation and change without departing from the proper scope and the fair meaning of the accompanying claims.

What is claimed:

1. A connector assembly, comprising:

a tubular conduit including a radially outwardly extending projection displaced from the terminal end of the conduit;

a housing including an axial bore for receiving the terminal end of said conduit and a collar portion through which said conduit is inserted, sale collar portion including a slot; and a latch connected to said housing including an inwardly extending tab which locks in behind said radially outwardly extending projection to at least assist in retaining said tubular conduit within said housing, said latch further providing means for verifying a complete connection between said tubular conduit and said housing, said tab being fully insertable into said slot when said tubular conduit is inserted sufficiently into said housing such that the annular projection has been inserted beyond the portion of the slot occupied by said tab;

wherein said latch includes means for attachment to one of said tubular conduit and said housing whereby upon attachment of said latch to said one of said tubular conduit and said housing the inwardly extending tab becomes selectively retained within said slot.

2. A connector assembly, comprising:

a tubular conduit including a radially outwardly extending projection displaced from the terminal end of the conduit;

a housing including an axial bore for receiving the terminal end of said conduit and a collar portion through which said conduit is inserted, said collar portion including a slot and means for releasably retaining said latch; and a latch pivotally connected to said housing including an inwardly extending tab which locks in behind said radially outwardly extending projection to at least assist in retaining said tubular conduit within said housing, said latch further providing means for verifying a complete connection between said tubular conduit and said housing, said tab being fully insertable into said slot when said tubular conduit is inserted sufficiently into said housing such that the annular projection has been inserted beyond the portion of the slot occupied by said tab;

wherein said housing further comprises means for selectively retaining said latch whereby upon retaining said latch, the inwardly extending tab becomes selectively retained within said slot.

3. A connector assembly, comprising:

a tubular conduit including a radially outwardly extending projection displaced from the terminal end of the conduit;

a housing including an axial bore for receiving the terminal end of said conduit and a collar portion through which said conduit is inserted, said collar portion including a slot and at least one window including a blocking wall;

a retainer element disposable within said collar portion for selectively locking the terminal end of the conduit within the housing, said retainer element including an annular ring having at least one deformable leg extending rearwardly therefrom, said deformable leg including a radially extending tab and a radially extending flange separated by a channel, said radially extending tab engaging said radially outwardly extending projection of said tubular conduit along one edge to preclude displacement of said conduit from said housing and engaging said blocking wall along another edge to preclude displacement of the retainer element from the housing; and a latch connected to said housing including an inwardly extending tab which provides means for verifying a complete connection between said tubular conduit and said housing, said tab being fully insertable into said slot when said tubular conduit is inserted sufficiently into said housing such that the annular projection has been inserted beyond the portion of the slot occupied by said tab;

wherein said latch includes means for attachment to one of said tubular conduit and said housing whereby upon attachment of said latch to said one of said tubular conduit and said housing, the inwardly extending tab becomes selectively retained within said slot.

4. A connector assembly, comprising:

a tubular conduit including a radially outwardly extending projection displaced from the terminal end of the conduit;

a housing including an axial bore for receiving the terminal end of said conduit and a collar portion through which said conduit is inserted, said collar portion including a slot having at least one window including a blocking wall and means for releasably retaining a pivotal latch;

a retainer element disposable within said collar portion for selectively locking the terminal end of the conduit within the housing, said retainer element including an annular ring having at least one deformable left extending rearwardly therefrom, said deformable left including a radially extending tab and a radially extending flange separated by a channel, said radially extending tab engaging said radially outwardly extending projection of said tubular conduit along one edge to preclude displacement of said conduit from said housing and engaging said blocking wall along another edge to preclude displacement of the retainer element from the housing; and a latch pivotally connected to said housing including an inwardly extending tab which provides means for verifying a complete connection between said tubular conduit and said housing, said tab being fully insertable into said slot when said tubular conduit is inserted sufficiently into said housing such that the annular projection has been inserted beyond the portion of the slot occupied by said tab;

wherein said housing further comprises means for selectively retaining said latch whereby upon retaining said latch, the inwardly extending tab becomes selectively retained within said slot.

5. A connector assembly, comprising:

a tubular conduit including a radially outwardly extending projection displaced from the terminal end of the conduit;

a housing including an axial bore for receiving the terminal end of said conduit and a collar portion through which said conduit is inserted, said collar portion including a slot; and a latch pivotally attached along a terminal end to said housing including a body portion having an inwardly extending validation tab extending from an inner surface thereof which locks in behind said radially outwardly extending projection to at least assist in retaining said tubular conduit within said housing and means for attachment to said tubular conduit extending from said body portion;

whereby upon inserting said conduit within said housing and pivotally rotating said latch toward engagement with said conduit the validation tab extends through the slot to lock in behind said radially outwardly extending projection;

wherein said latch includes a pair of spaced apart legs pivotally attached to the housing along one end and to said body portion along a second end and said means for attachment to said tubular conduit includes a pair of elongated tangs having inwardly extending ends extending from said body portion.

6. A connector assembly, comprising:

a tubular conduit including a radially outwardly extending projection displaced from the terminal end of the conduit;

a housing including an axial bore for receiving the terminal end of said conduit and a collar portion through which said conduit is inserted, said collar portion including a slot; and a latch pivotally attached along a terminal end to said housing including a body portion having an inwardly extending validation tab extending from an inner surface thereof which locks in behind said radially outwardly extending projection to at least assist in retaining said tubular conduit within said housing, and means for attachment to one of said housing and said tubular conduit extending from said body portion including at least one tang having an inwardly extending end which engages said one of said housing and said tubular conduit;

whereby upon inserting said conduit within said housing and pivotally rotating said latch toward engagement with said one of said housing and said tubular conduit the validation tab extends through the slot to lock in behind said radially outwardly extending projection;

wherein the body portion of said latch is pivotally connected along a first end to a hinge extending from the housing.

7. The connector assembly of claim 5, wherein said means for attachment to said conduit includes a wall having a recess which matingly engages the outer diameter of said tubular conduit.

8. A connector assembly, comprising:

a tubular conduit including a radially outwardly extending projection displaced from the terminal end of the conduit;

a pivotally rotatable latch; and a housing including an axial bore for receiving the terminal end of said conduit and a collar portion through which said conduit is inserted, said collar portion including an elongated slot and means for selectively retaining said latch;

said latch being pivotally attached to said housing along a terminal end and having a body portion with an inwardly extending validation tab extending from an inner surface thereof which locks in behind said radially outwardly extending projection to at least assist in retaining said tubular conduit within said housing;

whereby upon inserting said conduit within said housing and pivotally rotating said latch toward engagement with said housing, the validation tab extends through the slot to lock in behind said radially outwardly extending projection if the conduit has been sufficiently inserted within the housing;

wherein said means for selectively retaining the latch further comprises at least one outwardly extending projection and said latch further comprises at least one hook extending from the body portion of the latch for engaging said outwardly extending projection.

9. A connector assembly, comprising:

a tubular conduit including a radially outwardly extending projection displaced from the terminal end of the conduit;

a pivotally rotatable latch; and a housing including an axial bore for receiving the terminal end of said conduit and a collar portion through which said conduit is inserted, said collar portion including an elongated slot and means for selectively retaining said latch;

said latch being pivotally attached to said housing along a terminal end and having a body portion with an inwardly extending validation tab extending from an inner surface thereof which locks in behind said radially outwardly extending projection to at least assist in retaining said tubular conduit within said housing;

whereby upon inserting said conduit within said housing and pivotally rotating said latch toward engagement with said housing, the validation tab extends through the slot to lock in behind said radially outwardly extending projection if the conduit has been sufficiently inserted within the housing;

wherein said means for selectively retaining the latch further comprises a collar surface accessible through said slot and said latch further comprises a hook extending inwardly from said body portion whereby upon rotating said latch such that the validation tab extends through the slot, said hook engages the surface of said collar portion accessible through the slot.

10. A connector assembly, comprising:

a tubular conduit including a radially outwardly extending projection displaced from the terminal end of the conduit;

a pivotally rotatable latch; and a housing including an axial bore for receiving the terminal end of said conduit and a collar portion through which said conduit is inserted, said collar portion including an elongated slot and means selectively retaining said latch;

said latch being pivotally attached to said housing along a terminal end and having a body portion with an inwardly extending validation tab extending from an inner surface thereof which locks in behind said radially outwardly extending projection to at least assist in retaining said tubular conduit within said housing;

whereby upon inserting said conduit within said housing and pivotally rotating said latch toward engagement with said housing, the validation tab extends through the slot to lock in behind said radially outwardly extending projection if the conduit has been sufficiently inserted within the housing;

wherein said means for selectively retaining the latch further comprises a hook member extending from said housing whereby upon rotating said latch such that the validation tab extends through the slot, the body portion of said latch becomes locked under said hook member.

11. A connector assembly for use in securing a tubular conduit, said connector assembly comprising:

a housing including a bore adapted to receive one end of said tubular conduit and a slot providing access to said bore;

means for engagement provided along said conduit to assist in securing the conduit within said housing; and a latch including a first terminal end pivotally attached to said housing and an inwardly extending tab, said latch being movable to and from a position wherein said tab extends through said slot to engage the means for engagement provided along the conduit, said tab being capable of engaging said means for engagement only if said tubular conduit is inserted sufficiently within said housing;

wherein said latch includes means for attachment to one of said tubular conduit and said housing whereby upon attachment of said latch to said one of said tubular conduit and said housing the inwardly extending tab becomes selectively retained within said slot.

12. A connector assembly for use in securing a tubular conduit, said connector assembly comprising:

a housing including a bore adapted to receive one end of said tubular conduit and a slot providing access to said bore;

means for engagement provided along said conduit to assist in securing the conduit within said housing; and a latch including a first terminal end pivotally attached to said housing and an inwardly extending tab, said latch being movable to and from a position wherein said tab extends through said slot to engage the means for engagement provided along the conduit, said tab being capable of engaging said means for engagement only if said tubular conduit is inserted sufficiently within said housing;

wherein said housing further comprises means for selectively retaining said latch whereby upon retaining said latch, the inwardly extending tab becomes selectively retained within said slot.

13. A connector assembly for use in securing a tubular conduit including a radially outwardly extending projection, comprising:

a housing including a slot and an axial bore for receiving the portion of said tubular conduit including said radially outwardly extending projection; and a latch including a first terminal end pivotally attached to said housing and an inwardly extending tab which extends through said slot to become selectively locked in behind said radially outwardly extending projection thus providing a means for retaining said conduit within said housing;

wherein said latch includes means for attachment to one of said tubular conduit and said housing whereby upon attachment of said latch to said one of said tubular conduit and said housing the inwardly extending tab becomes selectively retained within said slot.

14. A connector assembly for use in securing a tubular conduit including a radially outwardly extending projection, comprising:

a housing including a slot and an axial bore for receiving the portion of said tubular conduit including said radially outwardly extending projection; and a latch including a first terminal end pivotally attached to said housing and an inwardly extending tab which extends through said slot to become selectively locked in behind said radially outwardly extending projection thus providing a means for retaining said conduit within said housing;

wherein said housing further comprises means for selectively retaining said latch whereby upon retaining said latch, the inwardly extending tab becomes selectively retained within said slot.

* * * * *

UNITED STATES PATENT AND TRADEMARK OFFICE
CERTIFICATE OF CORRECTION

PATENT NO. : 5,649,724
DATED : July 22, 1997
INVENTOR(S) : Thomas Wiethorn

It is certified that error appears in the above-indentified patent and that said Letters Patent is hereby corrected as shown below:

Col. 6, line 35, claim 1, "sale" should be --said--

Col. 7, line 58, claim 4, "left" should be --leg--

Col. 7, line 59, claim 4, "left" should be --leg--

Signed and Sealed this

Tenth Day of February, 1998

Attest:

BRUCE LEHMAN

Attesting Officer

Commissioner of Patents and Trademarks